Figure 1:
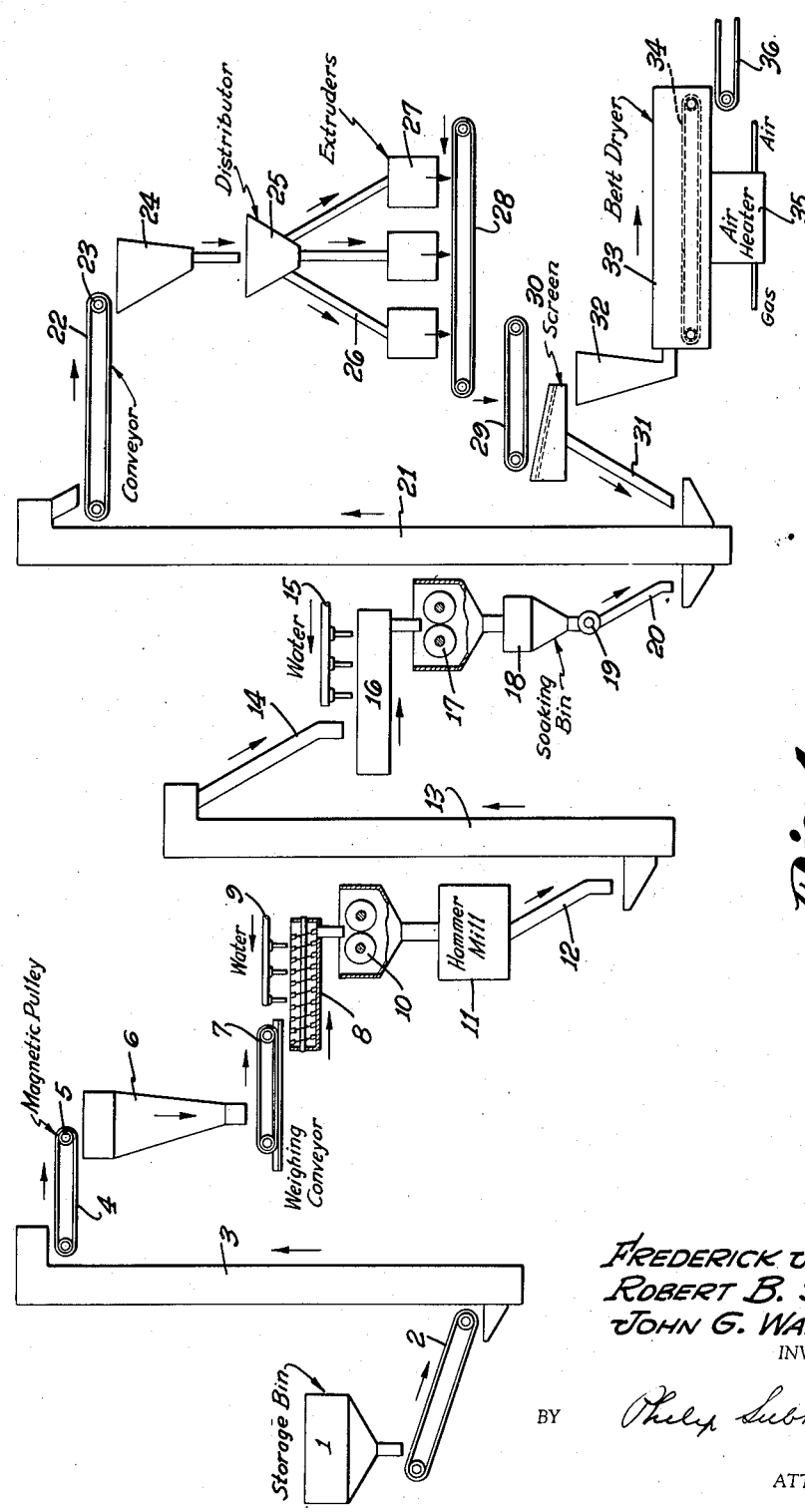

Patented Dec. 18, 1945

2,391,312

UNITED STATES PATENT OFFICE 2,391,312

CATALYST AND METHOD FOR FORMING CATALYSTS

Frederick J. Ewing, Pasadena, Robert B. Secor, South Gate, and John G. Warner, East Los Angeles, Calif., assignors to Filtrol Corporation, Los Angeles, Calif., a corporation of Delaware Application February 1, 1943, Serial No. 474,406

2 Claims. (Cl. 252—235)

This invention relates to catalysts and methods for forming catalysts. The catalysts formed by our process exhibit high surface activity. They are particularly useful as decolorizing materials, and are especially useful as catalysts in the conversion of hydrocarbons, such as catalytic cracking of oil.

Modern catalytic processes require catalysts which are not only specifically active in the chemical reactions which are to be catalyzed, but also possess physical characteristics required for successful commercial operation. Of outstanding importance are bulk density and hardness; that is, resistance to attrition. The ability of a particle to hold its shape notwithstanding the mechanical handling to which it is subjected in storage, shipment, and use is a primary requirement for a successful catalyst for modern catalytic processes.

Catalytic processes are classifiable in three categories. In fixed bed type catalytic processes, the catalyst is positioned in a bed through which the material flows. The bed is stationary. It is preferable to employ particles of predetermined particle size and particle size distribution in order that the required free space between the particles be attained. The screen analysis of the catalyst, if it is unpelleted, or the pellet size, if it is pelleted, is carefully controlled in the manufacture of a catalyst for this purpose. It is desirable that the particles or pellets maintain their size in shipping, handling, and in the charging of the catalyst bed, and resist crushing due to the weight of the catalyst in the bed.

In moving bed type processes, the bed of catalyst is in continuous motion. Spent catalyst is continuously discharged from the bottom of the catalytic reactor and fresh catalyst is continuously fed into the top of the reactor. The spent catalyst is regenerated in a regenerating zone and returned to the catalyst reactor. In this form of process the mechanical strength of the catalyst is of great importance since in its motion through the reactor it is subjected to considerable crushing and abrasion forces. It is also subjected to these forces in its passage to and through the regeneration zone and in its passage to the catalyst reactor. In this type of process it has been found most useful to employ the catalyst in pellet form. The strength of the catalyst pellet as well as the characteristics of the individual particles which make up the pellets are of highest importance.

In the fluid type catalyst process the catalyst is usually subdivided into small fragments or is in powder form. It is fed into a moving stream of vapor undergoing catalysis and passes, while suspended in the vapor stream, through a reactor. It then discharges into a separating zone which may be either of the mechanical separating type or of the Cottrell type or a combination of both. The precipitated catalyst is then fed into a regeneration zone, and the regenerated particles are reintroduced into the fluid stream passing to the catalyst reactor. In this type of process the individual particles are under abrasive forces of considerable magnitude and the disruption of the particle size introduces variables into the process controls which are undesirable.

In all three forms of catalytic processes, the hardness of the catalyst as manufactured and its hardness under the conditions of the process in which it is employed is of great importance.

In order to obtain catalysts having desired performance, it has also been found desirable to obtain a catalyst of high porosity. Since, however, high porosity; i. e., low bulk density, is associated with weak mechanical structure giving catalysts of low hardness values, a balance must be obtained between such values of density and hardness as to give high activity catalysts of desirable mechanical strength.

A particularly useful catalyst especially active in the conversion of hydrocarbons, such as cracking, are the acid treated montmorillonite clays of the sub-bentonite form. The clays in their native form show little or no decolorizing activity, that is, they have little or no power for removing color from vegetable or mineral oils. These clays when treated with dilute acids such as dilute sulphuric acid have their decolorizing power considerably enhanced. This same treatment also develops high catalytic activity. Such sub-bentonite clays are substantially non-swelling. The swelling bentonites are substantially inactivable by such acid treatment to yield decolorizing or catalytic clays. We have found that we may control the hardness and density of such acid treated clay by controlling the drying and mechanical working of such clays.

Hardness as employed in this specification and in the claims hereof may be evaluated by the following test procedure.

The catalyst either in the pellet form or in the granule form is screened to the desired mesh size. For instance, if it be a pellet it is screened to remove all particles smaller than the desired pellets. If it be a particle, for instance, 10–14 mesh, i. e., passing a 10 mesh and caught on a 14 mesh, it is screened to remove all particles caught on the 10 mesh and passing the 14 mesh.

The attrition apparatus consists of a metal can 3½" in diameter and 3¾" long. A Monel metal rod .417" in diameter and 2⅞" long and weighing 50 grams is placed in the can (or 8 steel balls 1⅜" in diameter). All hardness values later referred to were obtained using rod instead of balls. The can is mounted to rotate around its longitudinal axis. 80 cc. of the catalyst of proper mesh size, as above described, is screened into a 100 cc. graduated cylinder, tapping to a constant volume. The weight of the 80 cc. of catalyst is determined. The catalyst is placed in the can along with the rod and the can is rotated for one hour at 80 R. P. M. The catalyst is removed from the can and screened through the smallest size screen. Thus, if the original screen size was 10–14, the material is screened through a 14 mesh screen. If the original catalyst was of pellet form, the catalyst is screened to remove all particles smaller than the original pellet. The attrition loss is determined as follows:

$$\text{Attrition loss} = \left( \frac{\text{weight before test} - \text{weight after test}}{\text{weight before test}} \right) \times 100$$

$$\text{Hardness} = 100 - \text{attrition loss}$$

The value of the hardness is thus a percentage figure representing the per cent of the original particles, the particle size of which is not reduced when subjected to the above test. Hereinafter in the disclosure and claims, where a value of the hardness is given, it is the value obtained in the above manner when employing the test specified above. Thus, a hardness value of 80 or higher means that at least 80% of the material will not be broken down to smaller particles when subjected to the above test.

We must distinguish between two types of hardness. Dry hardness is that hardness, measured according to the above test, obtained on catalyst which has been dried during the course of manufacture usually at temperatures insufficient to remove all of the water content of the catalyst. Usually the water content of the dried catalyst is in the neighborhood of 15 to 20%, more or less. Such drying is usually carried out by heating catalyst to temperatures of about 250 to about 500° F. Calcined hardness is the hardness of the catalyst which has been dried down to a content of volatile matter found in the catalyst when in actual use. Such catalysts are subjected to temperatures ranging from 850 to 1250° F. when in use. In order, therefore, to determine the hardness of the catalyst when heated to the temperature reached in the catalytic process, the catalyst is first heated for 16 hours at a temperature of 1050° F., and the hardness is determined upon the catalyst so treated.

Apparent density (bulk density) is determined according to the following procedure:

The catalyst is calcined by heating for 16 hours at 1000–1100° F. Approximately 220 cc. of this material is measured into a 250 cc. graduated cylinder and tapped gently but firmly to a constant volume. The weight of the catalyst divided by its volume represents the apparent density.

Where the term "volatile matter content" or "per cent volatile matter" is employed, we mean the per cent content of water as determined by the following test procedure:

Five grams of the catalyst is placed into a 20 cc. crucible and ignited in an electric furnace for 30 minutes at a temperature of about 1800° F. and cooled in a desiccator.

$$\% \text{ volatile matter} = \frac{\text{loss of weight}}{\text{weight of ignited clay}} \times 100$$

We have found that we may control the density and the hardness of dry and of calcined catalyst both in its pelleted form and in its particle form by extruding the catalyst through dies under controlled conditions. The volatile matter content of the clay charged to the extrusion apparatus has a material effect on the hardness and density. There is an optimum value for the volatile matter content of the clay which will develop in the pellet the maximum dry hardness and give a pelleted catalyst of useful density. By controlling this volatile matter we may obtain the desired hardness both calcined and dry in both its pellet form and in its form as particles, and also the desired density of the material.

We have also found that the character of the drying operation to which the pelleted material is subjected has a material effect upon the hardness of the pellet. A rapid drying in which there is a rapid ebullition of moisture weakens the pellet and reduces its strength and hardness. By controlling the conditions of drying, we have found that we can obtain catalyst of high hardness value both in its pellet form and its particle form. We have found it preferable to control the drying conditions of the pellet so as to obtain a distillation of the water from the pellet as close to equilibrium conditions as is practicable. This we have obtained by holding the temperature and humidity of the atmosphere in which the moist pellet is being dried close to the equilibrium value so that the water in the pellet tends to evaporate quietly and does not vaporize explosively. The equilibrium conditions here referred to represent a humidity of the vapor space over the catalyst which at the temperature employed contains water at a partial pressure substantially equal to the vapor pressure of the water in the clay.

In order to obtain catalysts which have adequate dry and calcined hardness so as to resist the crushing and abrasive loads imposed on the catalyst in storing and handling, we have found that the catalyst in its pellet form should have a calcined hardness of at least about .85. The higher the dry and calcined hardness the better is the catalyst from this point of view. The calcined hardness of the particles of the clay which are obtained by grinding the pellet or are obtained directly by acid treating clay granules should also be at least 80, and preferably should be as high as 90.

We have found that the acid treated clay pellets should have a density at least as low as .8 and preferably at least as low as .75. Such clays will show a high catalytic activity giving high yields of gasoline when employed in cracking oils such as gas oil while giving low conversions of the oil to carbon. The higher the density, the higher the carbon formation, as a general rule.

By limiting the catalyst to an apparent density of about .8 or less, we find that the catalytic efficiencies of the pelleted clay and the fragments produced by grinding the pellets are as high as the efficiency of the unpelleted clay. We find that for comparable cracking conditions, the carbon formation of pelleted clays of high cracking activity having densities of .8 or less for example, .75 compares favorably with the carbon formation obtained in using the unpelleted high cracking activity clay. However, as the density of the pelleted clay exceeds .8 the carbon formation becomes much greater than that obtained with the unpelleted clay.

Figure 2:
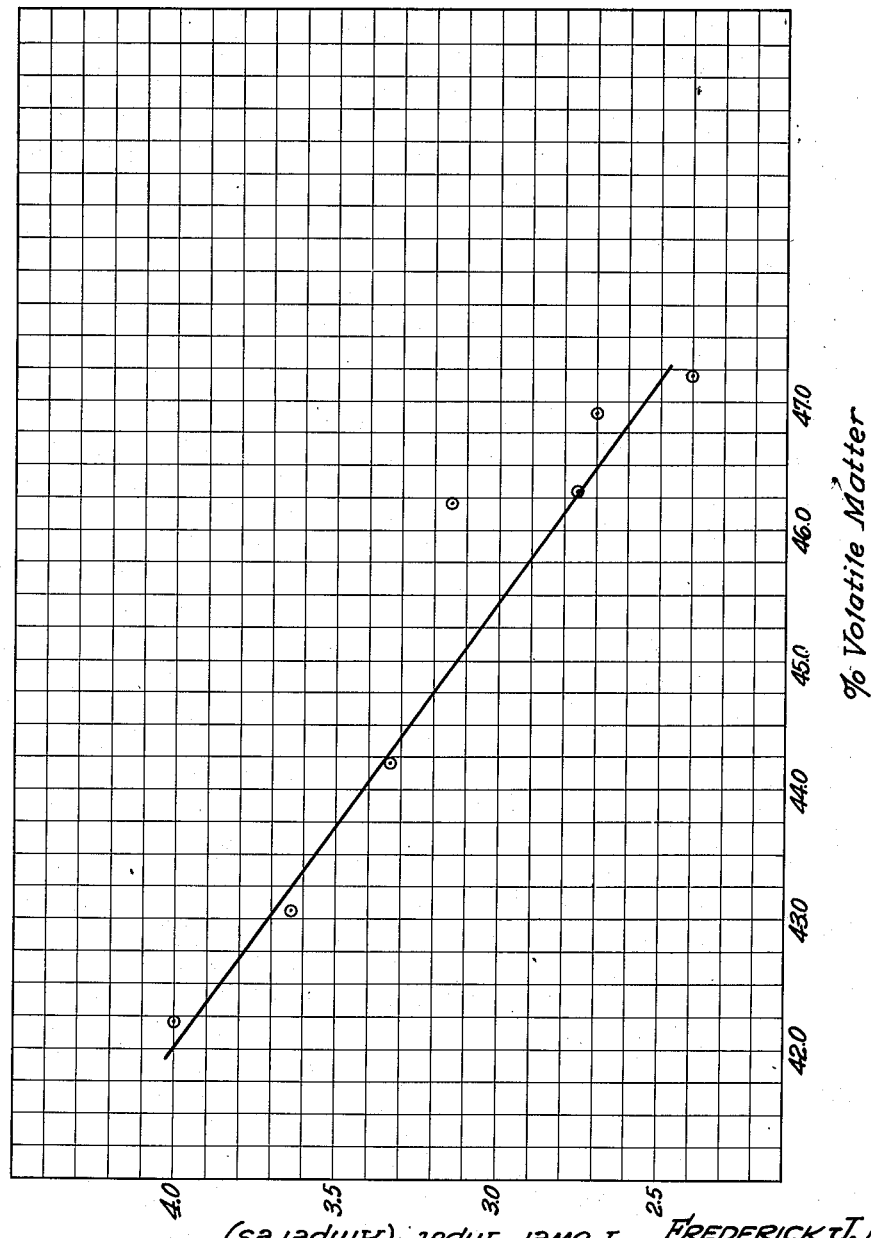
Figure 3:
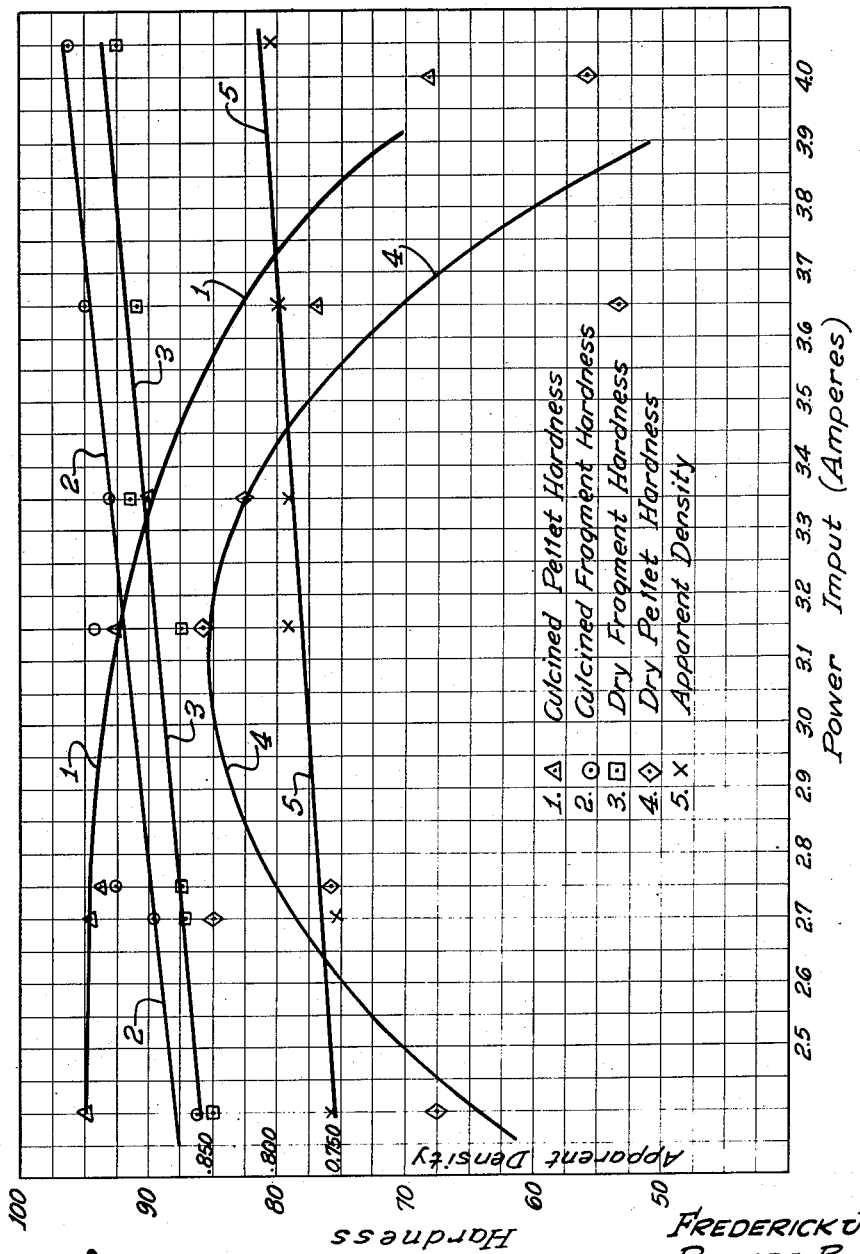

This invention will be further described in connection with the accompanying drawings, in which Fig. 1 is a schematic showing of our process for the production of pelleted materials; and Figs. 2 and 3 are charts.

The material processed in the plant shown in Fig. 1 may be any form of pelletable catalyst. It is preferably an acid treated sub-bentonite, as previously described. Characteristic examples of such clay are the so-called Cheto clays or Chambers clays coming from the vicinity of Cheto, Arizona, or Chisholm clay, coming from near Jackson, Mississippi. The Cheto clays, for example, have a characteristic analysis upon the volatile free basis as follows:

| | Percent by weight |
|---|---|
| $SiO_2$ | 67.3 |
| $Al_2O_3$ | 19.5 |
| $Fe_2O_3$ | 1.8 |
| $CaO$ | 3.2 |
| $MgO$ | 6.9 |
| $MnO$ | 0.8 |
| $Na_2O$ | 0.2 |

Such clays are treated with acid ranging from about 20 pounds of $H_2SO_4$ per 100 pounds of clay (calculated as volatile free) to about 150 pounds of acid per 100 pounds of clay (calculated as volatile free). Concentrations of acid may vary from 5% to 60% calculated upon the total water of the mix including the water content of the clay. Time and temperature are adjusted to obtain the desired degree of extraction. The effect of acid treatment and removal of $Al_2O_3$ and $Fe_2O_3$ is to decrease the extrudability of the clay. Thus clay treated with 150 pounds of acid and 12½% concentration to give a clay of about 10% ($Al_2O_3$ and $Fe_2O_3$) is extrudable with great difficulty. In like manner the density and pellet hardness decrease as the $Al_2O_3$ and $Fe_2O_3$ content of acid treated clay is decreased. The catalyst activity passes through a maximum when the $Al_2O_3$ and $Fe_2O_3$ content of the clay is in the region of 15 to 20%. It therefore is necessary to choose that degree of extraction which will give the desirable extrudability, pellet density, and hardness with maximum developable activity. Such a degree of extraction is represented by the following treatment.

The clay may be treated with 30 pounds of acid (100% $H_2SO_4$) per 100 pounds of clay calculated as volatile free at a concentration of about 12% calculated upon the total water content of the mix including the water content of the clay charged to the mix. Time of extraction is about 6 hours at a temperature of about 200–215° F. A desirable degree of extraction is such as to give final content of $Al_2O_3$ and $Fe_2O_3$ at about 10 to 20%, preferably about 15 to 20%. Characteristic analysis of the Cheto clay previously identified treated to the desired degree of extraction, based upon volatile free clay, is as follows:

| | Percent |
|---|---|
| $SiO_2$ | 71.5 |
| $Al_2O_3$ | 16.3 |
| $Fe_2O_3$ | 2.43 |
| $CaO$ | 2.26 |
| $MgO$ | 4.54 |

This clay when pelleted as described below to produce pellets having an apparent density of .8 or lower will have a high catalytic efficiency, yielding about 42% of 400° E. P. gasoline when used as a catalyst in cracking a 36 gravity East Texas oil at a temperature of about 800° F. when the gas oil vapor is passed at the rate of about 1.5 liters per hour per liter of catalyst. This catalytic efficiency is about four times that of the untreated clay. The decolorizing efficiency of the acid treated clay, both in the pelleted and in the unpelleted form, is about 3.5 times that of the raw clay. As a comparison, the raw clay must be employed in amounts equal to 2.9 times the amount of acid treated clay to obtain the same degree of color removal.

This clay is washed substantially free of acid and salts with water, filtered and dried to a moisture content of about 15 to 20%, for example, 18%, and ground to a powder and charged into hopper 1. The washed clay (without grinding) if brought to a desirable per cent volatile matter, as by drying or admixture with dried clay, forms a valuable extrusion mix except for accidental inclusion of foreign material which stops up the die plates. The latter material may be conveniently removed by wet grinding and classification. This is accomplished by wet grinding the clay before drying and then classifying by screens or hydraulic classification to remove impurities, such as bits of wood, embers, stone, glass, iron, and subsequently drying the clay to the desired per cent volatile matter.

From hopper 1 the clay is charged by conveyor 2 into bucket elevator 3 in which it is elevated and discharged onto a conveyor belt 4, operating in conjunction with magnetic pulley 5, which removes any stray fragments of iron. The material is charged to a storage bin 6. From this storage bin it is fed to a poidometer 7 which acts to automatically weigh out the clay and is discharged into mixers 8. These mixers are of paddle type which also act as conveyors to move the clay through the mixers. Into the mixer is introduced a regulated amount of water through nozzles 9. The water content is adjusted so that the mix fed to the extruders, as later described, has the desired moisture content to give the hardness and densities which are desired. The range of water content of the clay passed to the extruders is from about 40 to 50% and is adjusted within this range, as later described. The water is added in two stages with intermediate working as follows:

The partially moistened mixture of clay and water is discharged from the mixer 8 into rolls 10. The rolls are in surface contact and are preferably made of non-ferrous material such as granite. The material passing through the rolls is rolled under a regulated pressure and discharges as thin flat plates. It is fed into the hammer mill 11 where it is broken up into a powder and discharges through chute 12 into elevator 13. It passes from elevator 13 through chute 14 into another mixer conveyor 16 into which water is introduced through nozzles 15 in exactly the same manner as in mixer 8. The clay now having the desired moisture content is again passed through roll 17 similar to rolls 10 and again worked and flattened into plates.

It is discharged into an enlarged soaking bin 18. In this bin any inequality in the moisture content of the various particles of the clay is equalized, there being a distillation of water from the particles containing an excess amount of water to the drier portions of clay. The size of the bin is such as to give the required time for this moisture equalization. In this manner there is an assurance that the clay will have a uniform moisture content throughout. The discharge of the material from bin 18 is regulated by a feeder 19 which acts to discharge the clay at a controlled rate.

The clay containing the desired amount of water discharges through the chute 20 into bucket elevator 21, and from this elevator into a conveyer 22 which operates in conjunction with a magnetic pulley 23 to assure the separation of any particles of iron which have been accidentally introduced into the clay by any of the metallic surfaces with which it has come in contact. The clay passes into a hopper 24 from which it is introduced into a distributor 25 which distributes the clay equally between the extruders, shown schematically as three in number. The extruders operate to force the moistened clay through dies having holes of appropriate size. A knife operates across the face of the die to cut the pellets to the desired size. Many different types of extruders may be used, as will be understood by those skilled in the art. The extruded pellets cut to size by the extruder knives discharge onto a conveyer 28 from which the pellets pass onto a conveyer 29 and then onto reciprocated screens 30. These screens separate the undersized and oversized material from the pellets of desired size. The under and over sized material is discharged through chute 31 and introduced into the elevator 3 for reworking. The pellets of proper size discharge into hopper 32 and are introduced into the belt drier 33. Other types of driers such as the rotary kiln drier may be employed.

In this drier the material is brought down to a volatile content of about 15 to 20% under controlled drying conditions, as has been described above. From the belt drier the material is discharged onto conveyer 36 where it passes to storage. If desired the pellets may be ground to desired particle size by conventional grinding and screening apparatus.

It is desirable to form the apparatus so that the walls of those portions with which the acid treated clay comes in contact are made of a material which will not contaminate or poison the catalyst. Thus the inner walls of the apparatus may be chrome-plated or made of stainless steel. The walls may be coated with a plastic or siliceous material such as porcelain enamel.

The water content of the clay entering the extruders 27 is of great importance in obtaining the desired type of catalyst both in the pellet form and in the particle form produced by grinding the pellets. The following example illustrates the effect of the water content of the clay fed to the extruders upon the dry and calcined hardness of the pellet and fragment made by grinding the pellets, and also the effect of the water content of the clay charged to the extruders on the density of the calcined pellets. The clay employed in these examples was a Cheto clay treated according to the process previously described.

The clay was treated with 30 pounds of acid per 100 pounds volatile free clay at a concentration of 12% based on the total water content of the water-clay acid mixture in the manner previously described. The acid treated clay was washed substantially free of salts and acid employing soft water, filtered and dried to a volatile matter content of about 18% at a maximum temperature of 340° F. The dried clay was mixed with various percentages of water to give the volatile matter content as given in the following table, rolled as previously described through rolls and extruded through an extruder as described above. The pellets were ⅛″ long and ⅛″ in diameter. The pellets were dried in a rotary drier having a gas temperature at the inlet of 160° F. at the point of introduction of the feed. The temperature at the discharge end is 335° F. The time of the passage of the pellets through the driers was 28 minutes. The pellets were dried to a volatile matter content of from 15 to 20%. By this drying procedure the catalyst is dried slowly, permitting the water to vaporize at a low temperature at the inlet of the drier, when the clay has the highest water content. The clay travels slowly through the drier so that the temperature rise progresses uniformly at a low rate as the water content of the clay decreases. The pellets were ground and screened to remove the 10–14 mesh fragment.

Table 1 gives the power input required at the extruder for the production of pellets from the clay containing the various volatile matter contents and gives the dry hardness of the pellets and the fragments having a mesh size of 10–14 mesh, the calcined hardness of the pellets and fragments, and the apparent density of the calcined pellets.

Table 1

| Power input to extruder, amps. | Percent V. M. | Dried catalyst | | Calcined catalyst | | Apparent density of pellets |
|---|---|---|---|---|---|---|
| | | Pellets | Fragment | Pellets | Fragment | |
| 2.4 | 47.2 | 67.5 | 85.0 | 95.0 | 86.3 | 0.759 |
| 2.7 | 46.9 | 85.0 | 87.0 | 97.0 | 89.7 | .759 |
| 2.75 | 46.3 | 76.0 | 87.1 | 93.5 | 92.7 | .761 |
| 3.15 | 46.2 | 85.3 | 86.9 | 92.5 | 94.4 | .792 |
| 3.35 | 44.2 | 82.9 | 91.2 | 90.2 | 92.6 | .792 |
| 3.65 | 43.1 | 53.2 | 91.2 | 76.7 | 95.0 | .803 |
| 4.0 | 42.4 | 59.3 | 92.3 | 70.8 | 96.0 | .805 |

Fig. 2 shows the relationship between the power required for pelleting and the water content of the clay passed to the extruder. It will be seen that as the moisture content of the clay increases the power input required to form the pellets decreases.

In Fig. 3 we have plotted the relationship between the power required to pellet the clay and the hardness, both dried and calcined, of the pellets and of the fragments and the apparent density of the calcined pellets.

It will be seen from these curves and the data plotted thereon that the fragment hardness, both dry and calcined, increased with decreasing volatile matter or, conversely, with increasing power employed in the pelleting operation. However, the dry hardness of the pellets passes through a maximum so that the pellet hardness drops off in departing on either side of this maximum. The calcined pellet hardness also increases as the power input decreases or, conversely, as the volatile matter increases, until a maximum value is attained.

These data, therefore, show that in order to obtain a pellet having a density of .8 or less, it is desirable to employ power inputs on the particular machine employed of 3.75 amperes or lower, and this is attainable by employing moisture contents of at least 43½% when employing the clay used in these examples. Since we have found it desirable to obtain a dry hardness of the fragments in excess of about 85 and a dry pellet hardness in excess of about 80 with a calcined hardness, both fragment and pellet, of 85 or better, these data show that to obtain such a pellet it would be necessary to employ at least 2.6 amperes input to the machine, and to accomplish this we must use a clay mixture having a content of water of less than about 47%. Therefore, to produce a desirable pellet from this clay by the extruders herein employed, it would be necessary to employ a volatile matter content ranging from about 43½% volatile matter to about 47% of volatile matter.

While the specific values of the volatile matter content will vary with clays employed and with the size and nature of the extruder, it will be found that for every extruder and for clays of the nature of the acid treated sub-bentonites here employed the general principles illustrated by the above example apply. It will be found that as the volatile matter content of the moistened clay which is extruded increases, the apparent density of the calcined clay pellet will decrease, and that in order to obtain a pellet of apparent density less than about .8, it will be necessary to adjust the volatile matter content of the clay to be extruded to about 40% or higher. The particular percentage of the volatile matter of the clay will of course depend upon the nature of the clay and the character of the extruder and it must be adjusted for each particular case. This adjustment may be made according to the method here described.

When this adjustment is accomplished according to the principles here set forth the hardness of the pellet, both calcined and dry, will increase with decrease of the moisture content from the value of the moisture content necessary to attain an apparent density of 0.8. By the procedure herein set forth we may determine the moisture content necessary to give a pellet having a calcined and dried hardness in excess of about 80 while maintaining an apparent density of less than about .8. When this is accomplished the fragment hardness of the clay will be 80 or better. It is therefore possible by adjustment of the water content to obtain a pelleted clay and a clay fragment from such pellets having the desirable characteristics found to be particularly useful in cracking catalysts. We may thus obtain a pelleted clay catalyst having a density of .8 and lower and a dry hardness of about 80 and higher, and a calcined hardness of about 85 or 90 or higher, and also obtain fragments by grinding such catalyst which will have a dry hardness and calcined hardness of about 85 and higher. This we may do by adjusting the water content of the clay entering the extruders.

The effect of the rolls in producing a desirable catalyst appears to be primarily in facilitating and increasing the rate at which the clay may be extruded. This increase may be obtained with about the same power requirement. We have found that we may increase the capacity of an extruder to produce catalysts of adequate hardness and desirable apparent density by the preliminary rolling of the clay in the manner previously described. The following example illustrates the effect of these rolls:

Table II

|  | Power, amps. | Percent V. M. | Extr. rate, T/24 hrs. at 15.0% V. M. | Hardness, dried 6-7 | Hardness, dried 10-14 | Calcined 6-7 | Calcined 10-14 | Apparent density |
|---|---|---|---|---|---|---|---|---|
| No. rolls | 2.7 | 46.6 | 0.56 | 84.3 | 84.0 | 96.5 | 89.8 | 0.762 |
| Rolls | 2.7 | 46.7 | 0.767 | 85.0 | 87.0 | 97.0 | 89.7 | .759 |

In this example the clay containing a water content of 46.6% and produced in the manner described in connection with Table 1 was extruded with and without intermediate rolling. It will be observed that in both cases the same power input was required and the clay had substantially the same dry and calcined pellet hardness, substantially the same fragment hardness, and substantially the same apparent density. The rate of extrusion of the clay pellets (⅛" in diameter, ⅛" long) in tons per 24 hours, calculated on clay pellets dried to 15% volatile matter, showed an increase of almost 50% without increase in power input and without alteration in quality of product.

We have found that the apparent density of the clay also depends upon the amount of mechanical working imparted to the clay in the extruders. Thus from the above examples and Fig. 3 it will appear that the greater the power input into the extruder the higher the density of the pellet. Apparent density is also increased by re-extrusion. Thus if the pellet clay is re-extruded we get an increase in apparent density.

The following example shows this effect. The clay was a mixture of Chambers and Cheto clay processed the same as the Cheto clay in the previous examples. The density of the clay was .750 after extrusion. The clay was re-extruded and its density was increased to .842.

We have found that if the clay is extruded with sufficient moisture content to permit of such low mechanical working as to limit the resultant apparent density of the pelleted clay to lower than about 0.8, the characteristics of the clay as a catalyst and as an adsorbent is not impaired. Thus, in the previous examples the adsorption efficiency for decolorization of petroleum lubricating oil was substantially unchanged by the pelleting operation, the pelleted clay of 0.8 density, after grinding to about 100 mesh, had substantially the same adsorption efficiency, measured in terms of weight of clay required to yield a given color removal from a given volume of oil as did the unpelleted clay. However, the re-extruded clay of 0.842 density had a substantially lower efficiency, that is, it required more clay for the same color removal.

We desire, therefore, to limit the amount of working in the extruders to prevent any substantial impairment in the catalytic nature of the clay or any material alteration in the decolorizing properties of the clay. This we may do by limiting the working to that required to yield an apparent density of the pelleted clay to about .8 or less. In so doing we obtain a clay of high decolorizing efficiency and of high catalytic efficiency.

It is to be understood that the foregoing description of the embodiments of our invention is for purposes of illustration, and modifications may be made therein without departing from the spirit of the appended claims.

We claim as our invention:

1. A method of producing pelleted acid activated sub-bentonite montmorillonite clay which comprises mixing said clay with water, adjusting the quantity of water so that the mixture contains between about 44 and about 46% V. M., mechanically working said mixture and extruding said worked mixture through an extruder to form pellets, cutting off said pellets and drying said pellets to produce pellets which when dried to a V. M. of 15 to 20% have a dry hardness of better than about 80 and when calcined to a temperature of 1000 to 1100° have a calcined hardness of better than about 80.

2. A catalytic pellet, formed of catalytic acid activated sub-bentonite montmorillonite clay, having a calcined hardness above about 80 and a dry hardness above about 80 produced according to the process of claim 1.

FREDERICK J. EWING.
ROBERT B. SECOR.
JOHN G. WARNER.